(12) United States Patent
Qin et al.

(10) Patent No.: US 9,189,071 B2
(45) Date of Patent: Nov. 17, 2015

(54) METHOD AND DEVICE FOR DETECTING GESTURE INPUTS

(75) Inventors: Peng Qin, Beijing (CN); Lin Du, Beijing (CN)

(73) Assignee: Thomson Licensing, Issly les Moulineaux (FR)

( * ) Notice: Subject to any disclaimer, the term of this patent is extended or adjusted under 35 U.S.C. 154(b) by 0 days.

(21) Appl. No.: 13/882,592

(22) PCT Filed: Nov. 1, 2010

(86) PCT No.: PCT/CN2010/001733
§ 371 (c)(1),
(2), (4) Date: Apr. 30, 2013

(87) PCT Pub. No.: WO2012/058782
PCT Pub. Date: May 10, 2012

(65) Prior Publication Data
US 2013/0215017 A1    Aug. 22, 2013

(51) Int. Cl.
*G06F 3/01* (2006.01)

(52) U.S. Cl.
CPC ...... *G06F 3/017* (2013.01); *G06F 2203/04102* (2013.01)

(58) Field of Classification Search
CPC ....................... G06F 3/017; G06F 2203/04102
See application file for complete search history.

(56) References Cited

U.S. PATENT DOCUMENTS

| | | | |
|---|---|---|---|
| 6,369,794 B1 | 4/2002 | Sakurai et al. | |
| 2001/0042245 A1 | 11/2001 | Iwamura | |
| 2004/0001113 A1* | 1/2004 | Zipperer et al. | 345/853 |
| 2008/0040692 A1 | 2/2008 | Sunday et al. | |
| 2010/0040292 A1* | 2/2010 | Clarkson | 382/201 |
| 2010/0238137 A1 | 9/2010 | Han et al. | |

FOREIGN PATENT DOCUMENTS

| | | |
|---|---|---|
| CN | 1394325 | 1/2003 |
| JP | 2000196914 | 7/2000 |
| JP | 2009211563 | 9/2009 |
| TW | 200945148 | 11/2009 |
| WO | WO0169365 | 9/2001 |

(Continued)

OTHER PUBLICATIONS

Search Report Dated Aug. 11, 2011.

(Continued)

*Primary Examiner* — Dwayne Bost
*Assistant Examiner* — Maheen Javed
(74) *Attorney, Agent, or Firm* — Robert D. Shedd; Vincent E. Duffy; Michael A. Pugel

(57) ABSTRACT

A method is provided for detecting gesture inputs in response to a consecutive reciprocating movement before a detecting device, wherein, the consecutive reciprocating movement is made of a first type of gesture and a second type of gesture, each capable of being recognized by the detecting device to output a different control signal. The method comprises the steps of receiving the consecutive reciprocating movement starting with a first type of gesture among the two types, wherein, the first type of gesture and the second type of gesture occur alternately, and outputting control signals corresponding to the first type of gesture with times number equaling to the number of the first of type gesture contained within the consecutive reciprocating movement.

4 Claims, 4 Drawing Sheets

(56) References Cited

FOREIGN PATENT DOCUMENTS

| WO | WO0219310 | 3/2002 |
| WO | WO2010088035 | 8/2010 |

OTHER PUBLICATIONS

Alon et al., "A Unified Framework for Gesture Recognition and Spatiotemporal Gesture Segmentation", IEEE Transactions on Pattern Analysis and Machine Intelligence, vol. 31, No. 9, Sep. 2009, pp. 1685-1699.

Alon et al., "Accurate and Efficient Gesture Spotting via Pruning and Subgesture Reasoning", Boston U. Computer Science Tech. Report No. 2005-020, Aug. 2005. 10 pages.

Koara et al., "Gesture Recognition based on 1-Dimensional Encoding of Motion Changes", in the 10th International Conference on Advanced Robotics, 2001, pp. 639-644.

* cited by examiner

METHOD AND DEVICE FOR DETECTING GESTURE INPUTS

This application claims the benefit, under 35 U.S.C, §365 of International Application PCT/CN2010/001733, filed Nov. 1, 2010, which was published in accordance with PCT Article 21(2) on May 10, 2012 in English.

TECHNICAL FIELD

The present invention relates to user interface, and more particularly, relates to a method for detecting gesture inputs.

BACKGROUND

Gesture recognition, especially hand gesture recognition enables humans to interface with the machine and interact naturally without any mechanical devices. The gesture recognition can be conducted with techniques from computer vision and image processing. Using the concept of gesture recognition, it is possible to point a finger at the computer screen so that the cursor will move accordingly. The gesture includes static gesture, e.g. a victory sign (a hand gesture in which the index finger and middle finger are extended and parted whilst the thumb and remaining fingers are clenched), and dynamic gesture, i.e. within a period of a single valid gesture input, the shape (e.g. extend some fingers or clench some fingers) and/or position of user's hand is changed so as to form a valid gesture input. And sometimes, a consecutive hand shape change and/or hand movement can be interpreted as two or more instructions for the device.

The gesture input is applied into many fields. One application of the hand gesture input is a book reading application. For example, upon a horizontal stroke of a user hand (the trajectory of hand movement is substantially horizontal and the movement distance exceeds a certain value, e.g. 15 centimeters) before a camera, the device interprets this gesture input as an instruction to flip a page of the book. The backward or forward flip of the book depends on the movement orientation. FIG. 1 is a diagram illustrating a rightward gesture signaling the backward flip of the book according to the prior art. As can be seen from the FIG. 1, in order to make the rightward gesture, a user has to firstly put his right hand in front of the camera, and then move rightward for a certain distance. When the gesture is complete, i.e. the hand arrives at the stop position as FIG. 1 shows; the user needs to quickly withdraw his hand before the camera. Considering a scenario that user wants to flip several pages, let's say 5 pages at a time, he needs to perform 5 times of raising his hand, moving, stopping and withdrawing. It's really inconvenient for user and therefore reduces the user experience.

It's desired a new way of consecutive gesture inputs.

SUMMARY

According to an aspect of present invention, it is provided a method for detecting gesture inputs in response to a consecutive reciprocating movement before a detecting device, wherein, the consecutive reciprocating movement is made of a first type gesture and a second type gesture, each capable of being recognized by the detecting device to output a different control signal, the method comprises the steps of receiving the consecutive reciprocating movement starting with a first type gesture among the two types, wherein, the first type gesture and a second type gesture occur alternately; and output control signals corresponding to the first type gesture with times number equaling to the number of the first type gesture contained within the consecutive reciprocating movement.

According to another aspect of present invention, it's provided a device for detecting gesture inputs in response to a consecutive reciprocating movement, wherein, the consecutive reciprocating movement is made of a first type gesture and a second type gesture, each capable of being recognized to output a different control signal, the device comprises a capturing module for capturing the consecutive reciprocating movement that starts with a first type gesture among the two types, wherein, the first type gesture and a second type gesture occur alternately; and a processing module for output control signals corresponding to the first type gesture with times number equaling to the number of the first type gesture contained within the consecutive reciprocating movement based on the captured consecutive reciprocating movement.

It is to be understood that more aspects and advantages of the invention will be found in the following detailed description of the present invention.

BRIEF DESCRIPTION OF THE DRAWINGS

The accompanying drawings, which are included to provide a further understanding of the, illustrate embodiments of the invention together with the description which serves to explain the principle of the invention. Therefore, the invention is not limited to the embodiments. In the drawings.

DETAILED DESCRIPTION

An embodiment of the present invention will now be described in detail in conjunction with the drawings. In the following description, some detailed descriptions of known functions and configurations may be omitted for clarity and conciseness.

The purpose of the invention is to provide an easy way to give duplicate instructions by a consecutive reciprocating hand movement. The consecutive reciprocating movement can be recognized by the device as a set of sequential sub movements, and any adjacent two sub movements have opposite orientation directions. The type of instruction resulting from the consecutive reciprocating movement is decided by the first one within the set of sequential sub movements, and the number of resulting instructions is the same as the number of sub movements having the same orientation direction as the first one within the set (including the first one).

A detailed example in accordance with an embodiment of present invention is described below. The system comprises a camera used for capturing the consecutive images of the gesture input, and a processing device connecting to the camera. The processing device uses the consecutive images to generate corresponding instructions. In the embodiment, the trajectory of basic gesture for gesture recognition is substantially equal to a straight line (the actual gesture movement cannot be as straight as a line). In this example, horizontal hand wave gesture is used to illustrate the principle of present invention. However, it shall note that the principle of present invention can also be applied to other successive reciprocating movements, e.g. vertical hand wave, oblique hand wave, and even movement of extending and withdrawing hand before a depth-detectable camera.

The gesture recognition technique relates to image processing, and therefore, the gesture recognition can be carried out in real time manner based on real time image frames, or not carried out in real time manner, i.e. using the camera capturing a set of image frames, and then analyzing the set of image frames.

In fact all static gesture recognition (posture recognition) can be carried out in real time manner based on real time image frames. For example, when detecting a victory sign posture, the device only needs to judge the posture is a victory sign or not based on the analysis of the convex contour of hand shape. For dynamic gesture recognition, the device needs to capture a set of image frames, find the centroid of the hand in each frame, and judge what kind of gesture it is after analysis of this series of hand-centroid formed curve.

Figure 1:
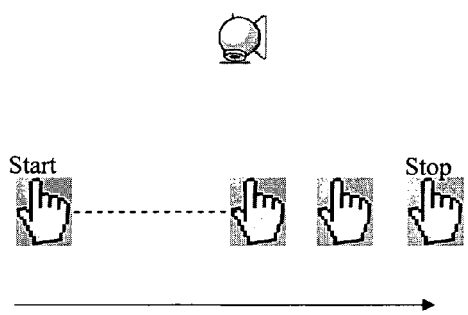
FIG. 1 is a diagram showing a hand move before a camera according to the prior art.
Figure 2A:
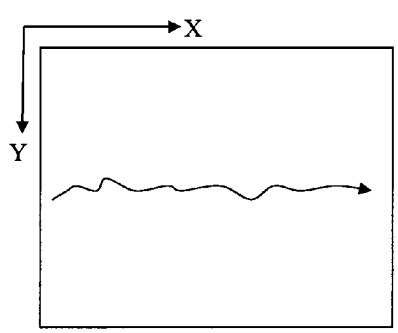
FIG. 2A, 2B are diagrams showing trajectory of a single hand wave according to an embodiment of present invention.
Figure 2B:
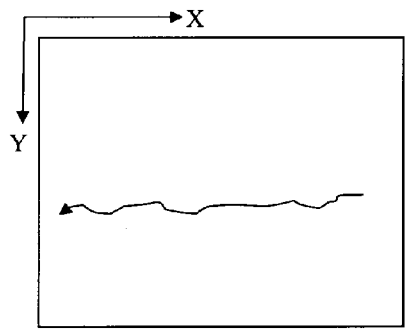

FIG. 2 is a diagram showing trajectory of a single hand wave according to an embodiment of present invention, wherein FIG. 2A shows rightward hand movement and FIG. 2B shows leftward hand movement. In this example, we assume the camera is the top left of coordinate system. It shall note that in the gesture recognition, the solid curve (or we called it substantially straight line) does not exist. The center of mass for the hand in each frame is equivalent to a point on the curve. Therefore, when all image frames for either direction of movement, for example, leftward hand movement, we will record a series of consecutive points, in order to describe conveniently, we use a line to link up all these points. The number of the discrete points depends on frame capture rate.

Figure 3:
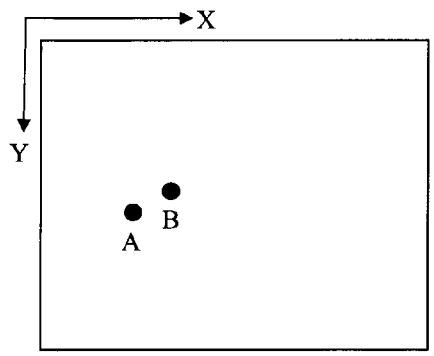
FIG. 3 is a diagram showing two points corresponding to two adjacent image frames according to the embodiment of present invention.

FIG. 3 is a diagram showing two points corresponding to two adjacent image frames according to the embodiment of present invention. The point A corresponds to the former one of the two image frames, and the point B corresponds to the latter one of the two image frames. Herein, we call the point A the last position point and point B current position point.

In this example, four motion directions are used, including up, down, left and right. As FIG. 3 shows, the point B lays to the right of the point A. It can be easily decided by the device because both points have coordinate values in the same coordinate system.

In the present embodiment, two data arrays are used to store the hand trajectory for the analysis of the user's gestures. If the motion trend is not reversed, e.g. as FIG. 2A shows, we store the hand trajectory data in the first array. After detecting the motion trend is reversed, we store the hand trajectory data since reversal of motion trend in second array, and then we use the data in first array to determine what gesture happens and output a corresponding instruction. In addition, a reverse threshold and the four direction counters are used to determine the occurrence of reverse motion. Since the user's consecutive gesture, such as horizontal hand wave, has certain regularity, for example, when people is doing the wave action, if it is leftward waving, it must firstly move leftward a distance then move rightward a distance, and repeated several times; if it is rightward waving, it must be the first to move rightward a distance then move leftward a distance, and repeated several times too, so we can select the directions counter based on the previous sub-gesture. Besides, in this embodiment, we always use the first array of data as a basis for judging a gesture.

Below describes the processing steps carried out for a position point among position points generated from hand movement according to the embodiment of present invention.

Step 1, at a time point during the successive gesture input, the device determines coordinate values of last position point and current position point of the hand. The pseudo-code is shown below:

```
Last position x coordinate (old_x) = (hand trace trend reverse happened) ? got last stored data in second array (pPointBuf1.x) : got last stored data in first array (pPointBuf0.x);
Last position y coordinate (old_y) = (hand trace trend reverse happened) ? got last stored data in second array (pPointBuf1.y) : got last stored data in first array (pPointBuf0.y);
Current position x coordinate (cur_x) = got hand x coordinate in current frame;
Current position y coordinate (cur_y) = got hand y coordinate in current frame;
```

It can be seen from above pseudo-code that current frame corresponding to the time point is used to determine the current position point's coordinate value. As for last position point that corresponding to an image frame immediately preceding to the time point, the device needs to first determine if reversal of motion trend has happened. If happens, the data in the second array will be used to determine the last position point's coordinate value, or otherwise, the data in the first array will be used to determine the last position point's coordinate value.

Step 2, four orientation counters for determining the motion trend of hand movement are updated based on the position relation of the current position point and the last position point. In this embodiment, we use four orientation counters to record upward direction, downward direction, leftward direction and rightward direction, respectively. But according to a variant, if there is no vertical hand gesture stipulated in the device, the upward and downward orientation counters are redundant.

Two orientation counters corresponding to opposite direction works in a group. For example, if the location of the current position point relative to last position point is in a left direction, then the leftward orientation counter will be added one, and at the same time, if the rightward orientation counter is not zero, then this counter will be subtracted one. And the same principle is applied to the upward and downward orientation counters. The related pseudo-code for determining the leftward and rightward counters (orientation_l and orientation_r) based on X-axis values is shown below. A similar principle can be applied to the determination of upward and downward counters based on Y-axis values.

```
If(cur_x > old_x) {//x-axis coordinate of current position is bigger than last position
    orientation_r++;// RIGHT orientation counter increase one
    If (orientation_l > 0) {// LEFT orientation counter bigger than zero
        Orientation_l--;
    } else {
        Orientation_l = 0;
    }
}
If(cur_x < old_x) {//x axis coordinate of current position is smaller than last position
    orientation_l++;// LEFT orientation counter increase one
    If (orientation_r > 0) { // RIGHT orientation counter bigger than zero
        Orientation_r--;
```

-continued

```
  } else {
    Orientation_r = 0;
  }
}
```

Figure 4:
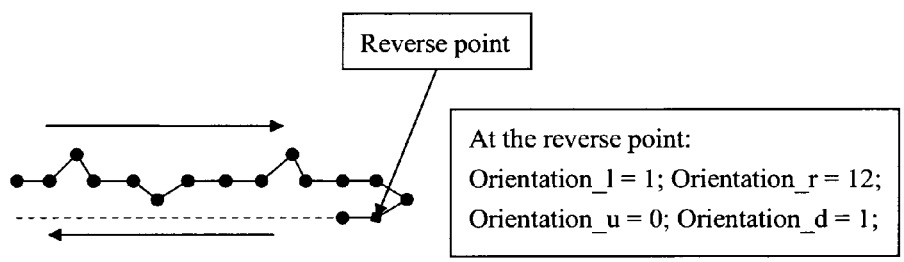
FIG. 4 is a diagram showing the hand trajectory from the start according to the embodiment of present invention.

FIG. 4 is a diagram showing the hand trajectory from the start according to the present embodiment. As can be seen from the FIG. 4, there are 14 points before the reverse point (the method for determination the reverse point will be described below). The reverse point can be deemed as the starting point of the reversing gesture. Therefore, according to the above manipulation method for Orientation_l and Orientation_r (in this example, we omit the manipulation for upward and downward orientation counters), at the point before the reverse point, i.e. the rightmost point, the Orientation_l is 0 and the Orientation_r 13. When it moves to the reverse point where cur_X<old_X, the Orientation_l is added one and becomes 1, and Orientation_r is substrated one and becomes 12.

Step 3, each time the device captures an image frame during the gesture input, the device determines if the motion trend reverses. During the gesture input, the device captures the gesture at a certain capture rate as a set of image frames. For each image frame, the device firstly determines a position point of user's hand in the image frame, and uses the position point and its preceding position point to update the relevant orientation counters. After orientation counters are updated, the device uses the orientation counters and an orientation threshold value to determine if the reversal of motion trend occurs. The orientation threshold value is a predetermined value, in this example, we set it as 6. The pseudo-code for determining if the motion trend reverses is shown below. Herein, a set of sub gesture orientation indicators, i.e. gesture_l, gesture_r, gesture_u and gesture_d are used to record the gesture orientation of last gesture among a consecutive gesture input or a consecutive reciprocating hand movement. Before a user inputs a consecutive gesture, these parameters are set false. And after the device detects the first sub gesture among the consecutive gesture input, the corresponding parameter will be set true.

Before the first sub gesture is detected, the maximum counter among the four counters is chosen to compare with the orientation threshold value. If the maximum counter is bigger than the threshold value and the orientation counter with the opposite orientation to the maximum counter is equal to 1, then it is determined that a reversal occurs, and set a sub gesture orientation indicator corresponding to the opposite orientation of the first sub gesture true. According to a variant, a single indicator with four value choices can be used to replace the four true-false indicators.

```
If (~(gesture_l | gesture_r | gesture_u | gesture_d))
{//four orientation trajectory reversal does not happened
    Got the maximum orientation counter;
    If (the maximum orientation counter > THRESHOLD && the
    opposite orientation counter == 1) {
        reverse = true;// Trajectory reversal happened
    }
}
```

Here, we still use FIG. 4 for illustration. At the rightmost point, the Orientation_l is 0 and the Orientation_r is 13. Although Orientation_r as the maximum counter is larger than the orientation threshold value 6, the opposite orientation counter, i.e. Orientation_l is 0. Thus, it's determined that a reversal does not occur. But at the reverse point, both conditions are met. Thus, it can be determined by the device that a reversal occurs.

As for the determination of reversal after the first sub gesture orientation indicators, the device determines if the following two conditions are met, 1) the orientation counter with the same orientation as the last sub gesture orientation indicator exceeds the threshold value; and 2) the orientation counter with the opposite orientation to the last sub gesture orientation indicator is equal to 1. If they are both met, it is determined that a reversal occurs. This will reduce the complexity of the calculation. A pseudo-code for determination of reverse after got gesture_l is shown below. The pseudo-code for other orientation indicators is similar.

```
If (gesture_l) {//last gesture is LEFT
    If((orientation_l > THRESHOLD) && (orientation_r == 1)) {
        Reverse = true;
    }
}
```

Figure 5:
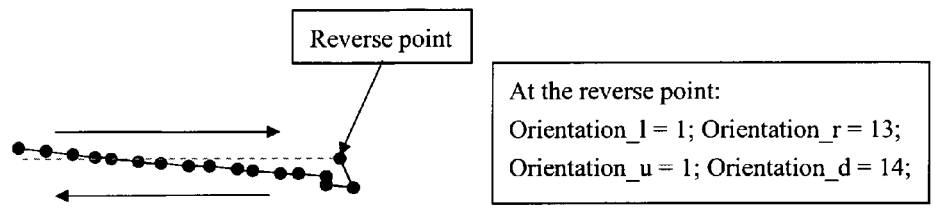
FIG. 5 is a diagram showing another hand trajectory from the start according to the embodiment of present invention.

Before a reversal is found, the data is stored in a first array pPointBuf0. Once the first reversal happens, the data in pPointBuf0 is used to interpret the gesture to output a signal indicating the meaning of the gesture. At this time, we can not only use the adjacent two points or just base on the number of orientation counter for all the points in pPointBuf0 to determine what gesture it is. Or otherwise, errors may be caused. FIG. 5 shows this situation. If the user is doing move rightward sub-gesture, it may also be accompanied by a downward move, although at the reversal point the downward orientation counter is bigger than rightward orientation counter, we cannot determinate this sub-gesture as downward gesture. If we overall look at this gesture, it is apparent the move rightward distance is far greater than the distance of move downward, and this sub-gesture should be judged to be rightward gesture. After the first reversal occurs, the data will be stored in a second array pPointBuf1. And we will use the relevant orientation counter to determine the occurrence of the second reversal. Please note that we do not use the pPointBuf1 data in this example to determine gesture. The data in the pPointBuf1 is only used to determine the occurrence of the second reversal, fourth reversal, sixth reversal etc. It can be easily concluded that the first array is used to store data of sub gesture movements having the same orientation as the first sub gesture movement, and the second array is used to store data of sub gesture movements having the opposite orientation to the first sub gesture movement because the gesture movements are reciprocating. The determination of the third reversal, fifth reversal, seventh reversal etc. is similar to the determination of the first reversal. And the determination of the fourth reversal, sixth reversal, eighth reversal etc. is similar to the determination of the second reversal. We use the difference of start point and stop point's x-axis and y-axis coordinate to judge what gesture happened (use of x-axis and y-axis amplitude ratio of a gesture trajectory to determine what kind of gestures is another method).

The below pseudo-code show how to determine what gesture happens.

```
Function calcAction( ) :
    If (nPointBufLength > 0) {// length of data array bigger than zero
        nDiffx = pPointBuf0[nPointBufLength-1].x -
        pPointBuf0[0].x;//Got the difference of x-axis nDiffx;
        nDiffy = pPointBuf0[nPointBufLength-1].y -
```

```
    pPointBuf0[0].y;//Got   the difference of y-axis nDiffy;
If (abs(nDiffx) > abs(nDiffy))
    If(nDiffx < 0) LEFT gesture occurred;
    Else RIGHT gesture occurred;
} else {
    If(nDiffy < 0) DOWN gesture occurred;
    Else UP gesture occurred;
}
Return gesture;
```

It can be seen from above that the absolute values of nDiffx and nDiffy are compared to determine what major movement occurs between horizontal movement and vertical movement. This is because user hand's movement cannot be an exactly horizontal movement or vertical movement. Although the difference in vertical is inevitable when intending to make a horizontal movement, the absolute difference value in horizontal shall be larger than that in vertical. After it's determined as the horizontal movement, the nDiffx is used to determine which gesture between left gesture and right gesture is.

The below pseudo-code shows how to process after the first reversal occurs:

```
If reversal occurred (reversal) {
    Call calcAction;
    Clear all four orientation counter;
    gesture_l = LEFT gesture happened;
    gesture_r = RIGHT gesture happened;
    gesture_u = UP gesture happened;
    gesture_d = DOWN gesture happened;
    Set pPointBuf0 length to zero;
    Push current data into pPointBuf1;
    Set pPointBuf1 length to one;
} else {
    Push data in pPointBuf0;
    PointBufLength0++;// Increase the length of pPointBuf0
}
```

The below pseudo-code shows how to process after the second reversal occurs:

```
If(reverse) {//after the first reversal occurs, bool variable reverse set
to true
    Got the four orientation counter;
    Got the maximum orientation counter;
    If (the maximum orientation counter  >  THRESHOLD
&& the related exclusive orientation counter == 1) {
        reverse =false;// second trajectory reversal happened, after the
        second reversal occurs, bool variable reverse set to false
    }
    If(!reserve) {
        Clear four orientation counters;
        Push current point in pPointBuf0[0];
        PointBuflength0 = 1;
    } else {
        Push current point in pPointBuf1;
        PointBufLength1++;// Increase the length of pPointBuf1
    }
}
```

After the reciprocating hand movements stop (hand holds for some times in the air, for example 2 seconds, or a special posture is used to indicate the stop, or user quickly withdraws his hand), if the number of the valid data in the first array pPointBuf0 is more than a certain threshold (usually at least 3, otherwise the gesture trajectory is too short, and can be ignored), we will use these data to determine what gesture occurs. The below pseudo-code show how to process after one continuous gesture stop:

```
If(gesture_stop) {
    If(PointBufLength0 > 2) {
        Call calcAction;
    }
    Clear all four orientation counter;
    Set all gesture orientation indicators to false;
    PointBufLength0 = 0;
    PointBufLength1 = 0;
}
```

Figure 6:
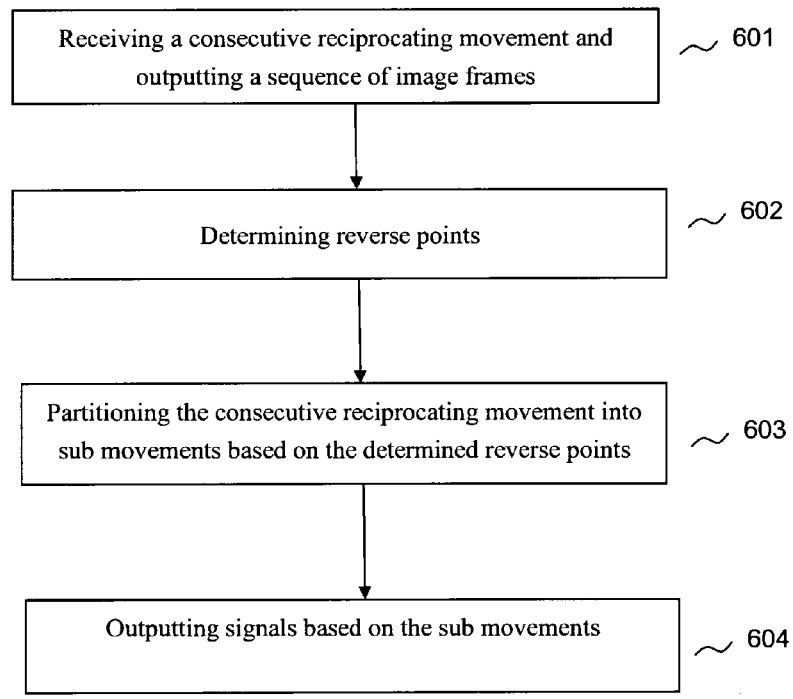
FIG. 6 is a flow chart showing a method for detecting gesture inputs from a consecutive reciprocating movement according to the embodiment of present invention.

FIG. 6 is a flow chart depicting a method for detecting gesture inputs from a consecutive reciprocating movement according to present embodiment. Herein, the consecutive reciprocating movement is made of two types of device recognizable gestures, each occurring several times.

Step 601, the device receives a consecutive reciprocating movement by using a camera to capture the movement, and outputs the result of a sequence of image frames. It shall note the step 601 here includes at least two scenarios that 1) the device keeps capturing the movement till the movement ends, and then the capturing module outputs the sequence of image frames; and 2) the capturing module outputs an image frame immediately in response to an image capture during the movement.

Step 602, the device determines at least one reverse point by using the sequence of image frames. Specifically, this step further comprises step 6021 determining a coordinate value corresponding to hand's position for each image frame so as to obtain a sequence of coordinate values. As to the determination of the coordinate value, it can, for example, convert the captured RGB image to HSV color space, and do background subtraction base on skin color. If needed, it can do some morphological operations, and then we can find the contour of the hand. The mass of this contour will be the coordinate value corresponding to hand's position for this frame. Step 6022 determining the reverse point based on the sequence of coordinate values by using above step 1 to step 3.

Step 603, the device partitions the consecutive reciprocating movement into sub movements based on the determined reverse point(s). Because the reverse point(s) is determined and the sequence of image frames corresponds to a consecutive reciprocating movement, sub movements are separated by the reverse point(s) within the sequence of image frames, and the reverse point is the starting point for any sub movement except the first sub movement. Besides, it shall note that all the partitioned sub movements are recognizable gestures.

Step 604, the device outputs at least one signal based on the partitioned sub movements. Specifically, the device firstly determines the number of sub movements including the first sub movement having the same orientation as the first sub movement, and then output signals with meaning corresponding to the recognizable first sub movement and number of which equal to the number of the sub movements having the same orientation as the first sub movement.

It shall note if the device processes the image frames in a real time manner, i.e. corresponding to the scenario 2 as stated in the step 601, the device may needs to, in response to each input of image frame, determine the first sub movement by finding the first reverse point and output a signal corresponding to the first sub movement. After determining the first sub movement, the device will determine, in response to each input of image frame, the second sub movement, third sub movement, fourth sub movement etc. in a sequential manner by finding the second reverse point, the third reverse point, the fourth reverse point etc., comparing separately the second sub movement, the third sub movement, the fourth sub movement etc to the first sub movement to determine if they are of the same type gesture, and if they are the device will outputs the same signal as the first sub movement.

According to the variant, because it is the consecutive reciprocating movement, it's needless to compare the second sub movement, the fourth sub movement, the sixth sub movement etc. Thus, the device only needs to determine the first sub movement, the third sub movement, the fifth sub movement. Of course, the device needs to determine every reverse point for partitioning the consecutive reciprocating movement into sub movements. After obtaining the third sub movement, the fifth movement etc, the device compares them with the first sub movement, and outputs, after each positive comparison, a signal corresponding to the first sub movement. In addition, because the movement is reciprocating, it may not be necessary to compare the odd-times sub movements. Instead, at every other reverse point starting from the first reverse point, the device outputs a signal corresponding to the first sub movement.

Figure 7:
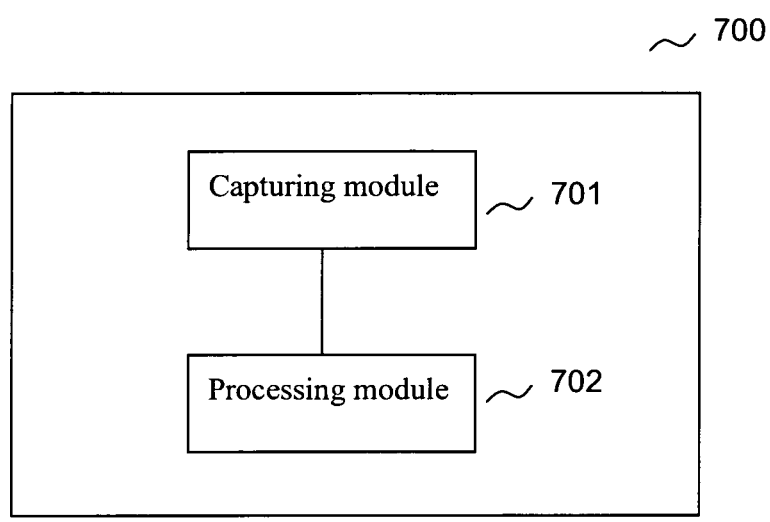
FIG. 7 is a block diagram showing a device for detecting gesture inputs from a consecutive reciprocating movement according to the embodiment of present invention.

FIG. 7 is a block diagram showing a device for detecting user inputs. As can be seen from the FIG. 7, it is provided a device for detecting gesture inputs in response to a consecutive reciprocating movement, wherein, the consecutive reciprocating movement is made of two types of recognizable gestures, i.e. a first type gesture (e.g. moving leftward) and a second type gesture (e.g. moving rightward), each capable of being recognized to output a different control signal, the device comprises a capturing module for capturing the consecutive reciprocating movement that starts with a first type gesture among the two types, wherein, the first type gesture and a second type gesture occur alternately; and a processing module for output control signals corresponding to the first type gesture with times number equaling to the number of the first type gesture contained within the consecutive reciprocating movement based on the captured consecutive reciprocating movement.

Further, the processing module is configured to determine reverse points for the consecutive reciprocating movement.

Further, the processing module is configured to partition the consecutive reciprocating movement into at least two sub movements by using the reverse points, each sub movement corresponding to one of the two types of gesture; comparing it to the first sub movement for each sub movement; and in response to determination that a sub movement being under comparison is of the same type as the first sub movement, outputting a control signal corresponding to the first type gesture.

Further, the processing module is configured to output a control signal corresponding to the first type gesture in response to each odd-times reverse point.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations shall fall in the scope of the invention.

The invention claimed is:

1. A method for detecting gesture inputs in response to a consecutive reciprocating movement for consecutively inputting a number of control signals corresponding to a plurality of first type gestures, wherein, the consecutive reciprocating movement comprises the first type gestures and a plurality of second type gestures, each capable of being recognized by a detecting device to output a different control signal, and the consecutive reciprocating movement starts with one of the plurality of first type gestures, the method comprising:
receiving the consecutive reciprocating movement starting with a first type gesture, wherein, the first type gesture and a second type gesture occur alternately by receiving a sequence of image frames of the consecutive reciprocating movement;
determining a point for each image frame;
determining reverse points based on the points of the sequence of image frames;
partitioning the consecutive reciprocating movement into at least two sub movements by using the reverse points, each sub movement corresponding to one of the two types of gestures; and
outputting the number of control signals corresponding to the first type gesture with the number of control signals corresponding to the first type gesture equaling to the number of the first type gesture contained within the at least two sub movements,
wherein the reverse point determination based on the points of the sequence of image frames further comprises
for each point starting from the second one of the points of the sequence of image frames, using four counters to record a positional relationship between the point and its adjacent preceding point, wherein at least one corresponding counter is increased by one based on positions of the point and its adjacent preceding point;
determining a counter with biggest value among the four counters; and
determining a particular point as a reverse point and setting the four counters to 0 when determining the counter with the biggest value exceeds a threshold value and counter of opposite orientation relative to the counter with the biggest value equals to 1 at the particular point.

2. The method of claim 1, wherein the outputting further comprises:
comparing each sub movement to the first sub movement; and
in response to a determination that a sub movement being under comparison is of the same type as the first sub movement, outputting a control signal corresponding to the first type gesture.

3. A device for detecting gesture inputs in response to a consecutive reciprocating movement for consecutively inputting a number of control signals corresponding to a plurality of first type gestures, the consecutive reciprocating movement comprises the first type gestures and a plurality of second type gestures, each capable of being recognized to output a different control signal, and the consecutive reciprocating movement starts with one of the plurality of the first type gestures, comprising:
a capturing module for capturing the consecutive reciprocating movement that starts with a first type gesture by capturing a sequence of image frames of the consecutive reciprocating movement, wherein, the first type gesture and a second type gesture occur alternately; and
a processing module for determining a point for each image frame; determining reverse points based on the points of the sequence of image frames; partitioning the consecutive reciprocating movement into at least two sub movements by using the reverse points, each sub movement corresponding to one of the two types of gestures; outputting a number of control signals corresponding to the first type gesture with the number of control signals corresponding to the first type gesture equaling to the number of the first type gesture contained within the at least two sub movements, wherein the processing module further for each point starting from the second one of the points of the sequence of image frames, using four counters to record a positional relationship between the point and its adjacent preceding point, wherein at least one corresponding counter is increased by one based on positions of the point and its adjacent preceding point;

determining a counter with biggest value among the four counters; and determining a particular point as a reverse point and setting the four counters to 0 when determining the counter with the biggest value exceeds a threshold value and counter of opposite orientation relative to the counter with the biggest value equals to 1 at the particular point.

4. The device of claim 3, wherein, the processing module is further configured to compare each sub movement to the first sub movement; and in response to a determination that a sub movement being under comparison is of the same type as the first sub movement, output a control signal corresponding to the first type gesture.

* * * * *